March 9, 1926.
M. H. PADE
1,576,061
APPARATUS FOR CURING PNEUMATIC TUBES
Filed Nov. 19, 1923
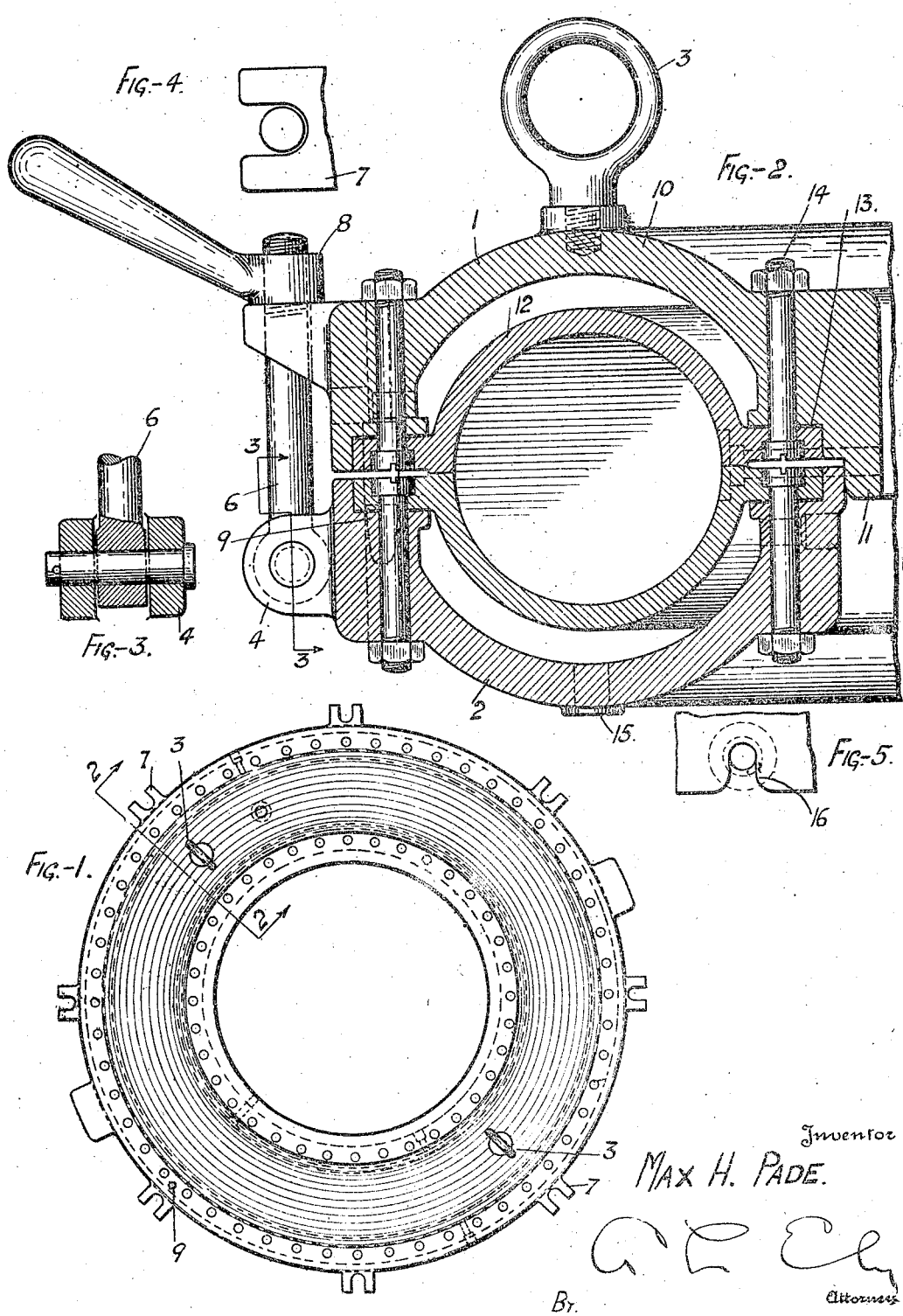

Patented Mar. 9, 1926.

1,576,061

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

APPARATUS FOR CURING PNEUMATIC TUBES.

Application filed November 19, 1923. Serial No. 675,436.

*To all whom it may concern:*

Be it known that I, MAX H. PADE, a citizen of the United States, residing at Akron, in the county of Summit, State of Ohio, have invented certain new and useful Improvements in Apparatus for Curing Pneumatic Tubes.

This invention relates to an apparatus for curing inner tubes of rubber, such as used in pneumatic tire casings, the apparatus being designed for curing the tubes while in circular condition.

In the drawings is shown one form of the invention, in which—

Figure 1 is a plan view of the apparatus;

Figure 2 is a section on the line 2—2 of Figure 1;

Figures 3, 4 and 5 are details of various parts of the apparatus as will appear.

The apparatus comprises an upper and a lower section, 1 and 2 respectively, divided upon a horizontal plane, the upper section being provided with loops 3 by which it may be elevated to insert the tube or remove it after it has been cured. In order to secure the two sections together, pairs of lugs 4 are provided at suitable intervals about the lower section, to each pair of which is pivoted a swinging bolt 6 adapted to be received between pairs of lugs 7 formed in the upper half of the mold. A nut 8 is threaded upon the outer end of the bolt so as to clamp the mold sections together. A suitable dowel 9 is provided in the upper section.

Each mold section is formed with an outer jacket 10 which is semi-circular in cross section, the upper jacket being provided with an overhanging rib or lug 11 which operates in conjunction with the dowel 9 to secure proper registration. The interior cavity or molding space is formed by two semi-circular shells 12, which are preferably made of aluminum. Each shell 12 is formed with extensions 13 which seat in correspondingly shaped recesses in the jackets, being held by bolts 14.

Steam is admitted to the chambers between the outer jackets and the shells through suitable inlets, one of which is indicated by the numeral 15. The valve stem of the tube is passed through suitable apertures 16 which formed in the inner circumferences of the sections, as indicated in Figure 5.

After the tube is placed between the shells and the mold closed, air, carbon dioxide, or a mixture of air and ammonia hydroxide or other suitable fluid is admitted under pressure to the interior of the tube through the valve stem. Steam is admitted through the inlets provided for that purpose so that it fills the chamber and the heat therefrom vulcanizes the tube. The shell is made of aluminum for the reason that it does not discolor the rubber and for the further reason that it is a better conductor of heat than the material of the jacket.

The form of vulcanizing device shown herein is very successful in the vulcanization of inner tubes and while the showing and description has been detailed in order to enable the invention to be understood, changes and modifications may be made therein and within the scope of the claims.

What is claimed is:

1. In an apparatus for curing circular rubber tubes, an upper and a lower mold section, each section being provided with an outer wall of lower conductivity and an inner wall of higher conductivity to form a continuous chamber therearound, and having means by which a heating fluid such as steam may be admitted.

2. In an apparatus for curing circular rubber tubes, an upper and a lower mold section, each section being provided with an outer wall of lower conductivity and an inner wall of higher conductivity to form a continuous chamber therearound, the inner walls being formed so that together they include an annular space of desired cross-section and being formed of material unaffected by vulcanizing stock, the outer jackets having means by which a heating fluid such as steam may be admitted.

3. In an apparatus for curing circular rubber tubes, an upper and a lower mold section, each section being provided with an outer wall of lower conductivity and an inner wall of aluminum having higher conductivity secured thereto, the space between the outer and inner wall constituting a heating chamber, the inner walls being formed so that together they enclose an annular space of the desired cross section.

MAX H. PADE.